US008712910B2

(12) United States Patent
Michelsen et al.

(10) Patent No.: US 8,712,910 B2
(45) Date of Patent: *Apr. 29, 2014

(54) EQUIPMENT TO FACILITATE MONEY TRANSFERS INTO BANK ACCOUNTS

(75) Inventors: Michael Michelsen, Arvada, CO (US); Dan Canning, Pembroke Pines, FL (US); Roberto Ochoa, Weston, FL (US); Rodolfo Zavaleta, Sunny Isles Beach, FL (US); Rodrigo Sada, Lone Tree, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,425

(22) Filed: Jul. 3, 2012

(65) Prior Publication Data

US 2012/0330762 A1 Dec. 27, 2012

Related U.S. Application Data

(63) Continuation of application No. 10/806,484, filed on Mar. 22, 2004, now Pat. No. 8,239,319.

(51) Int. Cl.
*G06Q 40/00* (2012.01)

(52) U.S. Cl.
USPC .......................................................... 705/39

(58) Field of Classification Search
USPC .......................................................... 705/39
See application file for complete search history.

(56) References Cited

U.S. PATENT DOCUMENTS

| | | | |
|---|---|---|---|
| 5,963,647 A | 10/1999 | Downing et al. | |
| 6,012,048 A * | 1/2000 | Gustin et al. | 705/39 |
| 6,317,745 B1 | 11/2001 | Thomas et al. | |
| 6,609,113 B1 | 8/2003 | O'Leary et al. | |
| 7,110,980 B2 | 9/2006 | Almonte et al. | |
| 7,660,771 B2 * | 2/2010 | Orcutt | 705/64 |
| 2001/0034682 A1 | 10/2001 | Knight et al. | |
| 2001/0051923 A1 * | 12/2001 | Kosuda | 705/43 |
| 2002/0016769 A1 | 2/2002 | Barbara et al. | |
| 2002/0077971 A1 | 6/2002 | Allred | |
| 2003/0222135 A1 | 12/2003 | Stoutenburg et al. | |
| 2005/0075968 A1 * | 4/2005 | Apostolides | 705/38 |
| 2005/0097050 A1 | 5/2005 | Orcutt | |
| 2009/0070230 A1 | 3/2009 | Silverstein et al. | |

FOREIGN PATENT DOCUMENTS

| | | |
|---|---|---|
| AU | 2005226634 | 6/2007 |
| EP | 1251470 A2 | 10/2002 |
| WO | 01/61663 | 2/2001 |
| WO | 2004/034222 | 10/2003 |

* cited by examiner

*Primary Examiner* — Olabode Akintola
(74) *Attorney, Agent, or Firm* — Kilpatrick Townsend & Stockton LLP

(57) ABSTRACT

Arrangements for transferring money to a bank account, typically when paid in cash or a cash equivalent at a point of sale device, are provided. Transactional information may be transmitted to a host computer system from a point of sale device. The transactional information may include information on a bank account that is to receive the money. At least some of the transaction information may be sent to an intermediary computer system that is configured to interact with a plurality of banking networks and may determine which one of the banking networks is associated with the bank account that is to receive the money. A request may be transmitted from the intermediary computer network to a local banking network and may include information on the bank account that is to receive the money and an amount of money to deposit.

20 Claims, 4 Drawing Sheets

EQUIPMENT TO FACILITATE MONEY TRANSFERS INTO BANK ACCOUNTS

CROSS-REFERENCES TO RELATED APPLICATIONS

This application is a continuation of U.S. patent application Ser. No. 10/806,484 filed Mar. 22, 2004, entitled "Equipment to Facilitate Money Transfers Into Bank Accounts". Such disclosure is hereby incorporated by reference in its entirety for all purposes.

BACKGROUND OF THE INVENTION

This invention relates generally to the field of money transfers, and in particular to money transfers directly into a recipient's bank account. In some cases, the deposit is made in a foreign bank account.

One popular way to transfer money is the so-called "money wire" technique. This service is provided by a variety of money transfer companies, including Western Union. To transfer money, a sender may enter a money transfer location of a distributed network of locations and fill out a money transfer form that may include information such as the recipient's name and the amount to be transferred. The sender provides the money to be transferred, along with a fee. This payment is typically made in cash. To pick up the money, the recipient may go to another money transfer location, provide appropriate identification and receive the money in cash.

Western Union's tremendous success is due in part due to the large number of money transfer locations located throughout the world, making it convenient for both senders and recipients to send money. This invention relates to other ways to facilitate the convenience in picking up a money transfer.

BRIEF SUMMARY OF THE INVENTION

In one embodiment, the invention provides a computerized system and method for transferring money to a bank account, typically when paid in cash or a cash equivalent at a point of sale device. According to the method, transactional information is transmitted to a host computer system from a point of sale device. The transactional information includes information on a bank account that is to receive the money. The transaction information is stored at the host computer system. Also, at least some of the transaction information is sent to an intermediary computer system that is configured to interact with a plurality of banking networks in different countries. The intermediary computer system may also determine which one of the banking networks is associated with the bank account that is to receive the money. A request is transmitted from the intermediary computer network to a local banking network and includes information on the bank account that is to receive the money and an amount of money to deposit. The bank account (such as a savings account, checking account, money market account and the like) may then be credited with the money. This may be done in real time or in batch mode. Once the money is deposited, the recipient may withdraw the money, either directly or indirectly, such as by using a debit card.

In one arrangement, the system may comprise an international bank computer system having a network of regional banks. The request to deposit the money may then pass from one of the regional banks and into the local banking network. As one example, the international bank computer system could be one operated by a global banking partner that has reach into various banking networks, such as Standard Chartered Bank, ABN AMRO, and the like. Such banks may have network contacts into each country's banking network through a third party or a subsidiary sub-bank.

In an alternative arrangement, the system may utilize a variety of intermediary computer systems in different geographic locations. These intermediary computer systems may each be configured to interact with one or more local banking networks in a certain country. For instance, the intermediary computer system may comprise a regional bank computer system (operated by a regional bank or banking association) which passes the request to deposit the money into the local banking network. As one particular example, the regional bank computer system could be computer systems operated by regional banks or associations, such as Banco Azteca (for Mexico), Chase Bank (for the U.S.) or China Union Pay (for China). The host computer system may be configured to determine which regional bank should receive the deposit information.

In another embodiment, the invention provides a method for processing a money transfer transaction where money is transferred into a recipient's bank account. According to the method, various information is entered into a point of sale device, such as a bank account number of a bank account that is to receive the money, a bank name of a bank that is to receive the money and a location of the bank. The account number, bank name and location are incorporated into a transaction identifier that is transmitted to a host computer system. Other information that may be input at the point of sale device includes an ABA number, a bank branch number and the like. Further, the customer may be provided with an identifier that is associated with the transaction identifier. Conveniently, this identifier may be used in subsequent transactions so that the other transactional information does not need to be re-input.

For example, the customer identifier may be input into a point of sale device when performing another money transfer transaction. The customer identifier is transmitted to the host computer system which performs a look-up and returns information contained in the transaction identifier to the point of sale device.

As part of the process, an amount to be transferred may also be entered into the point of sale device and transmitted to the host. This information is transmitted from the host computer system to a bank along with the transaction identifier.

In one particular aspect, the transaction identifier may comprise an eighteen digit number, with the first three digits corresponding to the bank name, the second three digits corresponding to the bank location, the next eleven digits corresponding to the account number, and the last digit corresponding to a check digit. In some cases, zeros may be added in front of the account number if it is less than eleven digits. Also, a look up may be performed to determine the first three digits based on the bank name. In a further aspect, a check digit may be included in the identifier and be based on the bank name, location and account number.

The invention further provides a computerized system for processing a money transfer transaction into a bank account. The system comprises a host computer system that is in communication with a plurality of point of sale devices. The host computer system has a processor and a memory and is configured to receive information on a bank account number of a bank account that is to receive the money, a bank name of a bank that is to receive the money and a location of the bank. The system is further configured to incorporate the account number, bank name and location into a transaction identifier, and to transmit to a point of sale device a customer identifier that is associated with the transaction identifier. Other information that may be input and transmitted includes the bank name, ABA, branch number, the city and state of the receiving bank and the like. In this way, all of the information needed to make up the full account number that is transmitted to the banking networks is organized together.

In one aspect, the transaction identifier comprises an eighteen digit number, with the first three digits corresponding to the bank name, the second three digits corresponding to the geographic location of the bank, the next eleven digits corresponding to the account number, and the last digit corresponding to a check digit. To generate the eighteen digit number, the host computer system may further be configured to add zeros in front of the account number if it is less than eleven digits. Also, the point of sale devices may be configured to perform a look up to determine the first three digits based on the bank name. Further, the host computer system may be configured to include a check digit based on the bank name, location and account number.

DETAILED DESCRIPTION OF THE INVENTION

Figure 1:
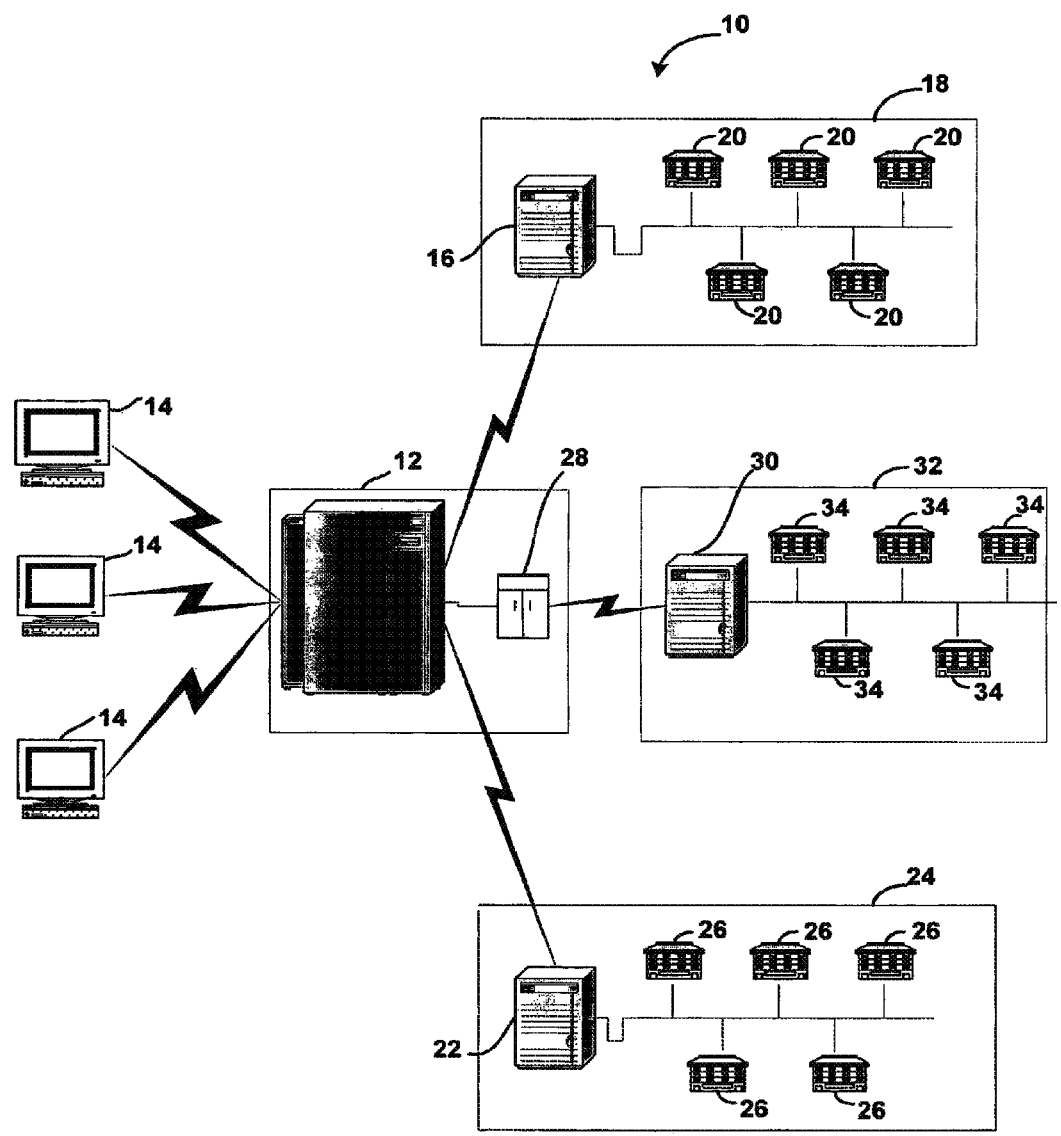
FIG. 1 is a schematic diagram of one embodiment of a system for transferring money into bank accounts according to the invention.

The invention provides various systems and methods for transferring money directly into a recipient's bank account. The money to be transferred is initially input into a money transfer system, and may be done so using a variety of portals. Merely as one example, money to be transferred may be input into a money transfer system by physically visiting a money transfer location, such as a Western Union location, and providing a clerk with the money. Typically, the money will be provided in cash, or as a cash equivalent, such as a check, money order, or the like. However, the invention is not limited to inputting the money in cash. Other forms of payment include debit cards, credit cards, stored value cards, by an ACH transfer from a bank account, and the like. In addition to physically visiting a money transfer location, remote techniques may be used as well, such as, for example, over the telephone, using a web portal and the like.

To accommodate such payment instruments and types, various input devices, such as terminals or interfaces may be used. For example, a local provider terminal may be used to accept cash, credit cards, checks, debit cards, stored value cards and smart cards. Examples of such terminals are described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference.

A kiosk terminal may also be used. The terminal may include a controller that communicates with various devices such as a computer, a PDA port, a telephone, a card reader, a card writer, a message issuer. As an alternative, a desk top computer system may be used and may include standard computer components as is known in the art, such as a screen display, one or more input devices, such as a keyboard, a pointing device, a touch screen, a speaker for voice recognition, and the like. In this way, various information regarding the money transfer may be input into the transfer system. The computer may communicate with interface network using a variety of communication techniques including via an internet interface, a dedicated telephone line, and the like. Hence, using the computer system, a user or a clerk may input the payment type, such as cash, a credit or debit card number, stored value account information, loyalty program account information, and the like, along with information on the recipient and the recipient's bank account. This information may then be processed by a host computer system to complete the transaction.

Once the money has been input into the money transfer system, various processes take place to route the money transfer request into the appropriate banking network and then to the appropriate bank where it may be deposited into the recipient's bank account. This determination may be made based on the country where the funds are to be deposited. In some cases, elements of the account number structure could be used to facilitate proper routing. For example, certain structures of the account number may correlate to certain countries. Once deposited, the recipient may be notified by the recipient bank's normal reporting process (such as in a monthly statement), or may be notified using other processes (such as by an email, mailing, phone notification, cell or mobile phone, or the like) orchestrated by the money transfer computer system. Once in the recipient's bank account, the money may be withdrawn or transferred using any processes offered by the recipient's bank. The sender may contact the recipient to notify the recipient of the transferred funds.

Referring now to FIG. 1, one embodiment of a money transfer system 10 will be described. Central to system 10 is a host computer system 12 that controls various aspects of money transfers. Host 12 may comprise a conventional mainframe computer system, such as the system used by Western Union, and has the ability to receive the transaction information and to route it to the appropriate banking network where the money may be deposited into the recipient's bank account.

Transaction information may be input into host computer system 12 using various point-of-sale devices 14. These point-of-sale devices may be configured to have a processor, input devices, a display screen, and the like as is known in the art. Using the display screen, various forms may be displayed to elicit various information needed in order to complete the money transfer transaction. For example, information such as the sender's name, the recipient's name, the recipient's bank account number, the amount to be transferred, and the like may be input into point-of-sale device 14 and transmitted to host computer system 12. In one option, the point-of-sale device 14 may contact host computer system 12 to determine if a customer is a first time or a repeat customer. If a repeat customer, various information may be transmitted from host 12 back to point-of-sale device 14 to pre-populate various screens in order to speed up the money transfer transaction process. Point-of-sale devices 14 may communicate with host computer system 12 using any type of network known in the art, including the telephone network, the Internet, other wide area networks, a local area network, wireless networks, and the like.

In the embodiment illustrated in FIG. 1, host computer system 12 is configured to take the transaction information and to determine how to route the transaction based on the location of the recipient's bank account. More specifically, the transaction needs to be routed to an appropriate banking system in order to route the transaction to the recipient's bank account. The particular financial institution or association that is to receive the transaction may vary depending on the particular location of the recipient's bank account, especially on the specific country where the recipient's bank is located. In some cases, elements of the account number structure could be used to facilitate proper routing. For example, certain structures of the account number may correlate to certain countries.

As one specific example, if the sender is sending money from the United States to a recipient's bank account located in Mexico, host computer system 12 may be configured to determine an appropriate banking partner in Mexico to forward the transaction. As one example, the transactional information may be sent to an intermediate computer system 16 that is located within Mexico. Some specific examples of an intermediate computer system include those operated by Banco Azteca, Banamex and the like. The computer system operated by Banco Azteca has the ability to route transitions within the Mexico banking network, illustrated generally by reference numeral 18. Examples of current banks within the Mexico banking network include Banco Batal, Banamex, Banco Santander, Banco Bancomer, and the like. Once the transaction information is transmitted from host 12 to intermediary computer system 16, it is forwarded through the Mexico banking network 18 to the appropriate bank 20 where the recipient maintains an account. Once the funds are deposited, the recipient may access the funds using any procedure accepted by the particular bank.

As another non-limiting example, a sender in the United States may desire to transfer money to a bank account in China. In such cases, host computer system 12 is able to identify an intermediary computer system 22 located within China which routes the transaction into the China banking network 24. One example of an intermediary computer system 22 within China is one operated by China Union Pay, an association which facilitates the movement of money between various banks 26. Through China Union Pay, the appropriate bank is identified so that the transferred money may be deposited to the recipient's bank account.

Host computer system 12 may also be used to transfer money into banks located within the United States. To do so, host computer system 12 may facilitate the use of a money transfer module 28 that is configured to generate and transmit a credit to an intermediary computer system 30, such as those operated by major U.S. banks. As one example, intermediary computer system may be operated by a bank, such as Chase Bank. Module 28 may be similar to the module described in copending U.S. application Ser. No. 10/267,150, filed Oct. 8, 2002, the complete disclosure of which is herein incorporated by reference. From module 28, intermediary bank 30 receives an ACH credit which then forwards the credit through the U.S. banking network 32 into an appropriate bank 34 in the U.S. Once deposited, the recipient may retrieve the funds using any process accepted by bank 34.

With the embodiment of FIG. 1, host computer system 12 is able to transmit the transaction to various banking partners located within different countries of the world. As an alternative to using various local intermediary computer systems, the host computer system could transmit the transactional information directly to a global banking partner which has hooks into the banking networks of various countries, through a third party or a subsidiary sub-bank. Such an embodiment is illustrated in FIG. 2, which uses like reference numerals to identify similar components.

Figure 2:
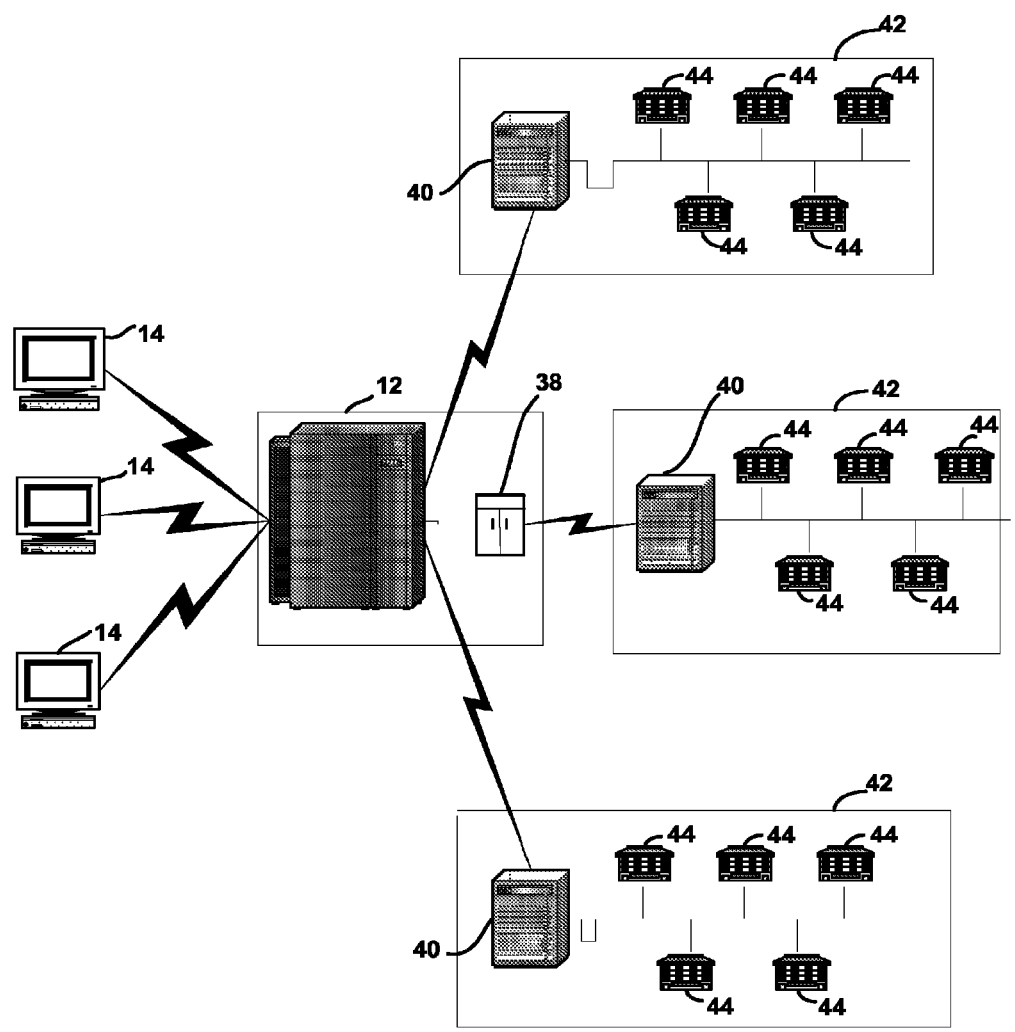
FIG. 2 is a schematic diagram of another embodiment of a system for transferring money into bank accounts according to the invention.

More specifically, in FIG. 2 the transactional information input at point-of-sale devices 14 is transmitted to host computer system 12 which then forwards the information to an intermediary computer system 38 which may be operated by a global banking partner, such as Standard Charter Bank, ABN AMRO, and the like. The intermediary computer system 30 then communicates with its own sub-banks 40 (or an associated third party bank) which may enter the transactional information into the appropriate banking network. For example, the global banking partner may transmit the money transfer request to a subsidiary sub-bank (such as a regional bank) operated in China, the United States, Mexico, or the like which transmits the money transfer request into the local banking network 42 and from there into the appropriate local bank 44.

Figure 3:
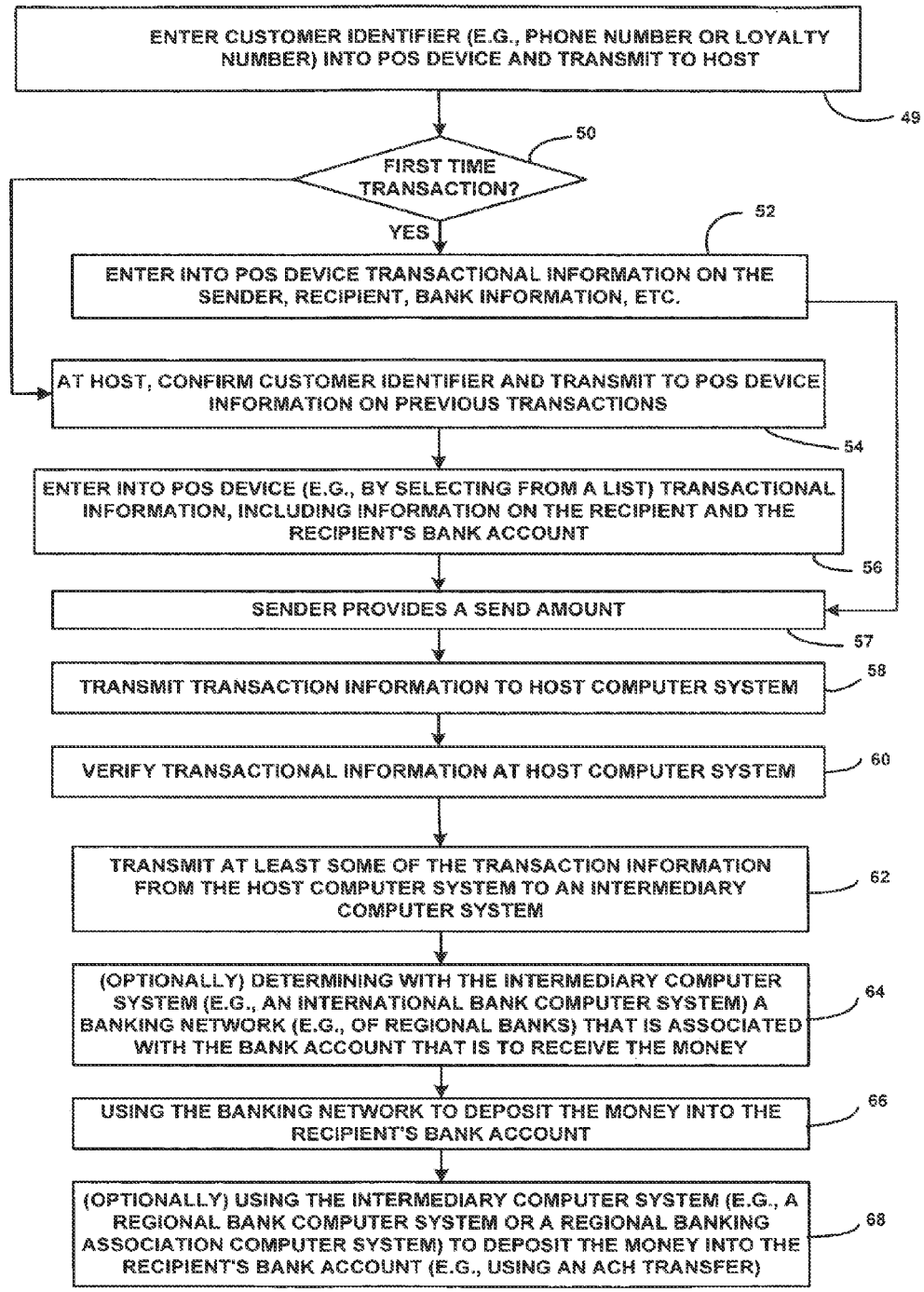
FIG. 3 is a flow chart illustrating one method for transferring money into bank accounts according to the invention.

Referring now to FIG. 3, one method for transferring money directly into a recipient's bank account will be described. Initially, all users may be required to provide some type of customer identifier, such as a phone number, social security number, loyalty number (for repeat customers) or the like, which is sent to the host computer system for evaluation as shown in step 49. The host computer system evaluates the input to determine whether this customer has performed any previous transactions as shown in step 50. If this is a first time sender, transactional information needed to perform the transaction is input into the point of sale device as shown in step 52. Such information may include sender and receiver names, address information, a sender phone number, information on the receiver's bank and bank account, and the like. If the sender has previously performed a money transfer transaction, the process proceeds to step 54 where the host computer system gathers information on previous transactions involving the sender and transmits this information back to the point of sale device. This permits a check to be made to confirm that this is the correct sender. Also, the point of sale device may display information concerning all previous receivers to which the sender has sent money. As shown in step 56, this allows the sender to select one of the receivers to which the sender desires to send money. For example, the clerk may select the desired recipient from a list so that this information does not need to be re-input. Hence, information from the host may be used to "paint the screen" of the point of sale device with information from previous transactions so that the sender simply needs to confirm correct data, information on the receiver's bank, the sender's address, the correct service to be used, and the like.

In step 57, the sender provides information on the amount of money to be deposited into the receiver's bank account. This information is input into the point of sale device.

Once the transactional information has been entered into the point-of-sale device, it is transmitted to the host computer system as illustrated in step 58. The host is employed to verify the transactional information, such as by checking to make sure a proper bank account number has been input. Other types of information that may be input at the point-of-sale device and checked at the host computer system include the recipient's name, the amount to be transferred, the recipient's address, the name of the recipient's bank, the location of the recipient's bank, and the like.

Once the host computer system has the appropriate transactional information, it may process the information into an appropriate format and then determine the appropriate intermediary computer system which is to receive the processed transactional information as illustrated in step 62. Depending on the type of intermediary computer system, various options are available for routing the transaction. For example, as illustrated in step 64, if the intermediary computer system is an international banking computer system with sub-banks located throughout the world, the international banking computer system may determine the appropriate banking network that is associated with the bank account that is to receive the money. The banking network may then be used to deposit the money into the recipient's bank account as illustrated in step 66. Alternatively, if the intermediary computer system is a regional bank computer system or a regional banking association computer system, the intermediary computer system may deposit the money directly into the recipient's bank account using the local banking network. For example, if the local banking network is in the United States, the intermediary computer system may perform an ACH transfer to deposit the funds into the recipient's bank account as illustrated in step 68.

Once the money has been transferred, the recipient and/or clerk may receive a receipt that is printed at the point-of-sale device. Information on the receipt may include an identifier, such as a money transfer control number that allows the transaction to be identified in the host computer system. The receipt may also include the sender's name, the receiver's name, the city in which the recipient's bank is located, the total amount transferred, any fees charged, and the like. Other information that may be provided to the sender includes the sender's address, the receiving bank, any loyalty information, the recipient's bank account number or routing number, any disclaimers or messages, signature lines, and the like.

Figure 4:
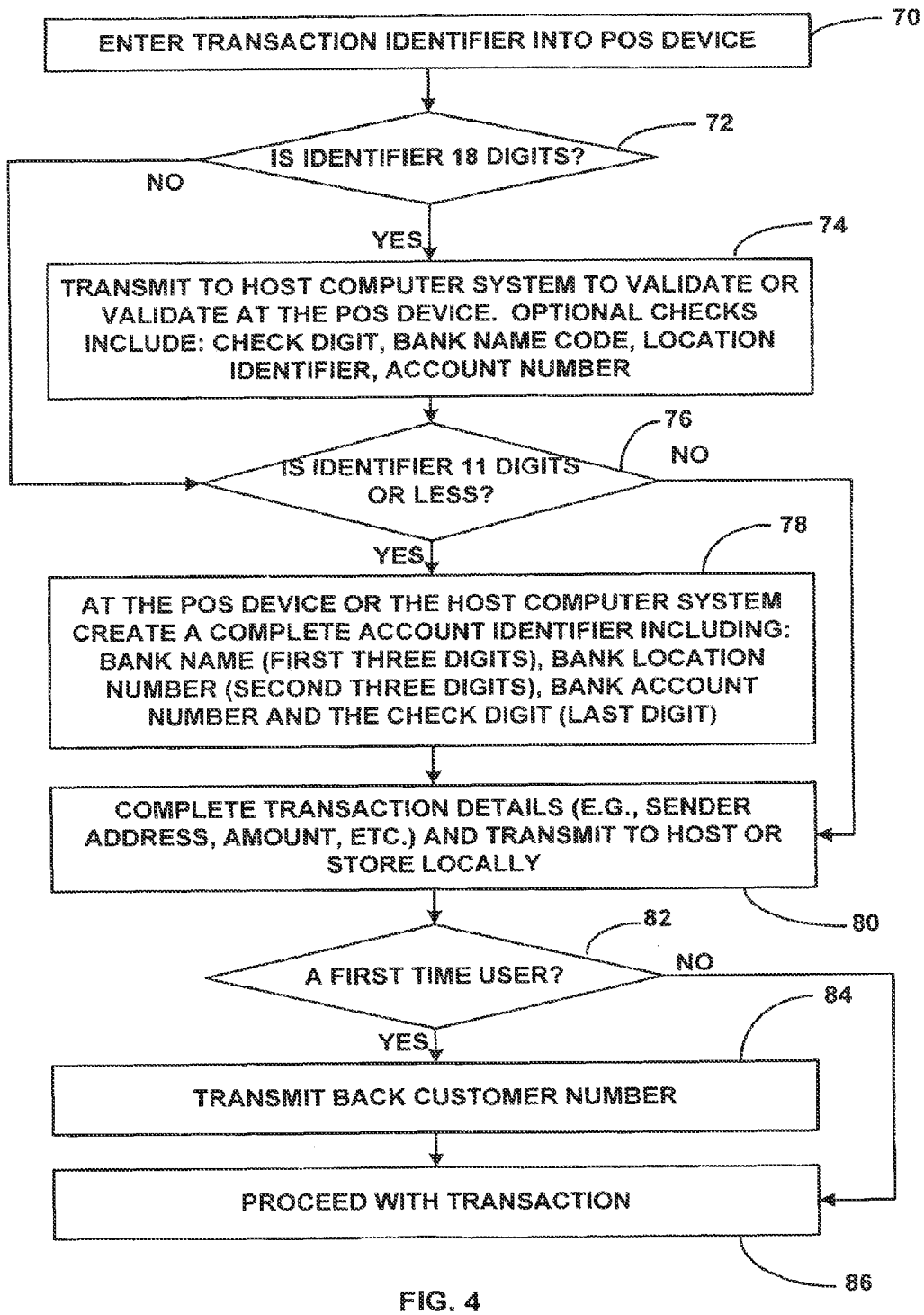
FIG. 4 is a flow chart illustrating one method for generating a transaction identifier according to the invention.

In some cases, the local banking network may need to receive the money transfer information in a certain format. FIG. 4 illustrates one method for placing the transactional information into an appropriate format. The method illustrated in FIG. 4 is particularly useful in countries such as Mexico, but the invention is not limited to only the Mexico banking network. As illustrated in step 70, a transaction identifier is input into the point-of-sale device. The transaction identifier may need to be in an 18 digit format in order for the local banking network to route the transaction. Hence, in step 72 a check is done to insure that the identifier is 18 digits. This check may be done at the point of sale device or at the host. If 18 digits, the process proceeds to step 74 where the host computer system (or the point of sale device) may optionally perform various checks or validations. For example, a check may be performed to confirm that the check digit value of the account number is correct. When using the 18 digit format, the first 3 digits (digits 1-3) represent a code indicative of a bank name. The next 3 digits (digits 4-6) are the location number or "Plaza" number. This value is the correlated numeric value to the city/state of the recipient's bank that is to receive the deposit. The next 11 digits (digits 7-17) are the recipient's bank account number. In some cases, this value may be less than 11 digits. In such cases, the method may be configured to transform the bank account number into 11 digits as described below. Finally, the last digit (digit 18) is a check digit. The check digit is evaluated at the host to determine whether or not the other information in the transaction identifier has been appropriately input.

The table below illustrates an algorithm to confirm or create the check digit.

To determine the check digit, the computer system multiplies the aggregated total number (bank number, Plaza number and account number by the weights of "3, 7 and 1." This starts from the left and moves to the right. The product that is created will only consist of the ones digit (e.g. 6×7=42; only the '2' is used).

```
  00211501600326941
  37137137137137137
  00237507600362927
```

The total amount of the products is summed together. The ones digit of this summation is then used as the check digit. Hence, the host computer system (or the point of sale device) will be configured to run this algorithm and if the check digit is incorrect, then a message will be sent back to the point-of-sale device (if it is not calculated at the point of sale device) to have the number re-entered.

Various other optional checks that may be performed at the host or the point of sale device include a check to perform wherein the first three digits correlate to a valid bank name number. A check may be performed to confirm whether the second three digits correlate to a valid geographic location identifier. Further, a check may be performed to confirm whether the 11 digit bank account number value is valid.

If the bank account number is 11 digits or less (as illustrated in step 76) the host computer system or the point of sale device may construct a "full" account number (such as the 18 digit number described above) as shown in step 78. It will be appreciated that for some intermediary banks, an 18 digit number is not needed because the bank has their own internal format. However, in cases where the account number will go outside such an intermediary bank, an 18 digit number may be needed. Further, in some cases, the intermediary bank could be configured to generate the 18 digit number (rather than the host or the point of sale device).

In step 78, if the account number is 11 digits, it may be assumed that the identifier that has been entered is the recipient's bank account number. If the identifier is not 11 digits, zeros are added to the account number (beginning at the left of the account number) until the full number is 11 digits. Also, a bank number (digits 1-3) and a Plaza number (digits 4-6) also need to be provided. This may be done by having the user chose at the point-of-sale device the bank name and assigning a three digit value that corresponds to the bank name. Merely by way of example, the point-of-sale device may list the following banks and their associated number.

| Num. | Bank Name |
|------|-----------|
| 002  | BANAMEX   |
| 002  | CITIBANK  |

| Bank | Plaza | Account Number | Check Digit |
|------|-------|----------------|-------------|
| 3 digits | 3 digits | 11 digits | One digit |
| 0  0  2 | 1  1  5 | 0  1  6  0  0  3  2  6  9  4  1 | ? |

-continued

| Num. | Bank Name |
|---|---|
| 003 | SERFIN |
| 006 | BANCOMEXT |
| 012 | BANCOMER |
| 012 | BBVA |
| 014 | SANTANDER MEXICANO |
| 019 | BANJERCITO |
| 021 | BITAL |
| 022 | GE Capital |
| 030 | BANCO EL BAJIO |
| 032 | IXE |
| 036 | INBURSA |
| 037 | INTERACCIONES |
| 042 | MIFEL |
| 044 | SCOTIABANK INVERLAT |
| 058 | BANREGIO |
| 059 | INVEX |
| 060 | BANSI |
| 062 | AFIRME |
| 072 | BANORTE |
| 102 | ABN Amro |
| 103 | American express |
| 106 | Bank of America |
| 107 | Bank Boston |
| 108 | Bank Tokyo |
| 110 | JP Morgan |
| 113 | Dresdner Bank |
| 114 | Bank One |
| 116 | ING |
| 119 | HSBC |
| 124 | Deutsche |
| 126 | Credit Suisse |
| 127 | AZTECA |
| 149 | BANRURAL |
| 161 | BANCRECER |
| 166 | BANSEFI |
| 168 | HIPOTECARIA FEDERAL |

A similar process may be used to determine the Plaza number by having the user enter the city/state where the recipient's bank is located and then performing a look-up to determine the appropriate Plaza number. With the bank name number (first 3 digits), bank location number (second 3 digits) and the account number (the next 11 digits), the host computer system may calculate the check digit in a manner similar to that previously described and then generate the customer full account number as 18 digits.

The following two examples illustrate the generation of the 18 digit number when the account number provided by the user is 11 digits, and when less than 11 digits.

Example 1

| | |
|---|---|
| 1. Account number give of | "12345678901" |
| 2. Bank name given of Banamex | "002" |
| 3. Location of Aguascalientes, AGS | "010" |
| 4. Full account number of: | "00201012345678901" |
| 5. Full account number with check digit: | "002010123456789015" |

Example 2

| | |
|---|---|
| 1. Account number given of | "123456789" |
| 2. Bank name given of Banamex | "002" |
| 3. City/State of Aguascalientes, AGS | "010" |

| | |
|---|---|
| Full account number of | "00201000123456789" |
| Full account number with check digit | "002010001234567897" |

In step 80, all other transaction details are completed, such as obtaining the sender's address, amount to be sent, and the like. This information may be transmitted to the host computer system if in a distributed system, or stored locally if locally withheld. The 18 digit number and other information may be transmitted to a local bank, such as Banco Azteca, to process the transaction. A receipt may also be printed and provided to the sender.

As illustrated in step 82, an inquiry may be made as to whether this is a first time user. If so, a customer number (such as a loyalty card number) may be generated and transmitted back to the customer as illustrated in step 84. (The loyalty card number could be generated any time during the transaction.) The customer number may comprise the 18 digit number, or another type of customer number that may be saved by the user. Hence, when performing another money transfer transaction, the customer may simply provide the customer number which will be used to pre-populate the point-of-sale device screen with the 18 digit number and any information on the sender and proposed recipient. Once this information is provided, the transaction may continue as illustrated in step 86.

The invention has now been described in detail for purposes of clarity and understanding. However, it will be appreciated at certain changes and modifications may be practiced within the scope of the appended claims.

What is claimed is:

1. A method for conducting a money transfer, the method comprising:
   receiving, at a computer system, from a point-of-sale device, a transaction identifier indicating a bank account, wherein:
     funds are to be deposited into the bank account;
     the transaction identifier includes a bank account number associated with the bank account; and
     the transaction identifier is a length of digits;
   determining, by the computer system, the transaction identifier is a complete transaction identifier if the length of digits of the transaction identifier is a first length of digits;
   creating, by the computer system, the complete transaction identifier if the length of digits of the transaction identifier is a second length of digits, wherein:
     the complete transaction identifier is created using the bank account number, a bank identifier associated with the bank account, and a bank location number of the bank associated with the bank account; and
     the second length of digits is less than the first length of digits; and
   initiating, by the computer system, the money transfer using the complete transaction identifier.

2. The method for conducting the money transfer of claim 1, further comprising:
   receiving, at the point-of-sale device, from a user sending the money transfer, an indication of a name of the bank associated with the bank account where the funds are to be deposited.

3. The method for conducting the money transfer of claim 2, further comprising:
   determining the bank identifier associated with the bank account based on the indication of the name of the bank received from the user sending the money transfer.

4. The method for conducting the money transfer of claim 1, further comprising:
receiving, at the point-of-sale device, from a user sending money, an indication of a location of the bank associated with the bank account where the funds are to be deposited.

5. The method for conducting the money transfer of claim 4, further comprising:
determining a plaza number associated with the bank account based on the location of the bank received from the user sending the money transfer, wherein the complete transaction identifier is created using the plaza number.

6. The method for conducting the money transfer of claim 1, wherein the complete transaction identifier is exactly 17 digits in length and the bank account number is 11 digits in length.

7. The method for conducting the money transfer of claim 6, wherein the bank identifier is 3 digits and the complete transaction identifier further includes a plaza number and a check digit.

8. The method for conducting the money transfer of claim 1, further comprising:
determining, by the computer system, the transaction identifier is less than the second length of digits; and
in response to determining the transaction identifier is less than the second length of digits, adding, by the computer system, zeros to the most significant digits of the transaction identifier to make the number of digits of the transaction identifier be the second length of digits.

9. The method for conducting the money transfer of claim 1, further comprising:
receiving, by the point-of-sale device, an indication that a user sending the money transfer is a first-time user;
creating a customer number for the user; and
in response to receiving the customer number when the user is conducting a second money transfer, pre-populating the complete transaction identifier at the point-of-sale device for the user.

10. A system for conducting a money transfer, the system comprising:
a point-of-sale device; and
a host computer system configured to:
receive from the point-of-sale device, a transaction identifier indicating a bank account, wherein:
funds are to be deposited into the bank account;
the transaction identifier includes a bank account number associated with the bank account; and
the transaction identifier is a length of digits;
determine the transaction identifier is a complete transaction identifier if the length of digits of the transaction identifier is a first length of digits;
create the complete transaction identifier if the length of digits of the transaction identifier is a second length of digits, wherein:
the complete transaction identifier is created using the bank account number, and at least one of:
a bank identifier associated with the bank account, and
a bank location number of the bank associated with the bank account; and
initiate the money transfer using the complete transaction identifier.

11. The system for conducting the money transfer of claim 10, wherein the host computer system is further configured to:
receive, from a user sending the money transfer via the point-of-sale device, an indication of a name of the bank associated with the bank account where the funds are to be deposited; and
receive, from the user sending the money transfer via the point-of-sale device, an indication of a location of the bank associated with the bank account where the funds are to be deposited.

12. The system for conducting the money transfer of claim 11, wherein the host computer system is further configured to:
determine the bank identifier associated with the bank account based on the indication of the name of the bank received from the user sending the money transfer; and
determine a plaza number associated with the bank account based on the location of the bank received from the user sending the money transfer, wherein the complete transaction identifier is created using the plaza number.

13. The system for conducting the money transfer of claim 11, wherein the point-of-sale device is configured to:
determine the bank identifier associated with the bank account based on the indication of the name of the bank received from the user sending the money transfer; and
determine a plaza number associated with the bank account based on the location of the bank received from the user sending the money transfer, wherein the complete transaction identifier is created using the plaza number.

14. The system for conducting the money transfer of claim 10, wherein the complete transaction identifier is exactly 17 digits in length and the bank account number is 11 digits in length.

15. The system for conducting the money transfer of claim 14, wherein the bank identifier is 3 digits and the complete transaction identifier further includes a plaza number and a check digit.

16. The system for conducting the money transfer of claim 11, wherein the host computer system is further configured to:
determine the transaction identifier is less than the second length of digits; and
in response to determining the transaction identifier is less than the second length of digits, add zeros to the most significant digits of the transaction identifier to make the number of digits of the transaction identifier be the second length of digits.

17. The system for conducting the money transfer of claim 11, wherein the host computer system is further configured to:
receive an indication a user sending the money transfer is a first-time user;
create a customer number for the user; and
in response to receiving the customer number when the user is conducting a second money transfer, pre-populate the complete transaction identifier at the point-of-sale device for the user.

18. A computer program product residing on a non-transitory computer-readable storage medium for conducting a money transfer, the computer program product comprising computer-readable instructions configured to cause a processor to:
receive a transaction identifier indicating a bank account, wherein:
funds are to be deposited into the bank account;
the transaction identifier includes a bank account number associated with the bank account; and
the transaction identifier is a length of digits;
receive, from a user sending the money transfer via the point-of-sale device, an indication of a name of the bank associated with the bank account where the funds are to be deposited;

receive, from the user sending the money transfer via the point-of-sale device, an indication of a location of the bank associated with the bank account where the funds are to be deposited;

determine the bank identifier associated with the bank account based on the indication of the name of the bank received from the user sending the money transfer;

determine a plaza number associated with the bank account based on the location of the bank received from the user sending the money transfer, wherein the complete transaction identifier is created using the plaza number;

create the complete transaction identifier if the length of digits of the transaction identifier is a first length of digits, wherein:
   the complete transaction identifier is created using the bank account number, a bank identifier associated with the bank account, and a bank location number of the bank associated with the bank account; and initiate the money transfer using the complete transaction identifier.

19. The computer program product residing on the non-transitory computer-readable storage medium of claim 18, wherein the complete transaction identifier is exactly 17 digits in length and the bank account number is 11 digits in length.

20. The computer program product residing on the non-transitory computer-readable storage medium of claim 18, wherein the computer program product further comprises computer-readable instructions configured to cause the processor to:

receive an indication a user sending the money transfer is a first-time user;

create a customer number for the user; and in response to receiving the customer number when the user is conducting a second money transfer, pre-populate the complete transaction identifier at the point-of-sale device for the user.

\* \* \* \* \*